Figures 1, 2:
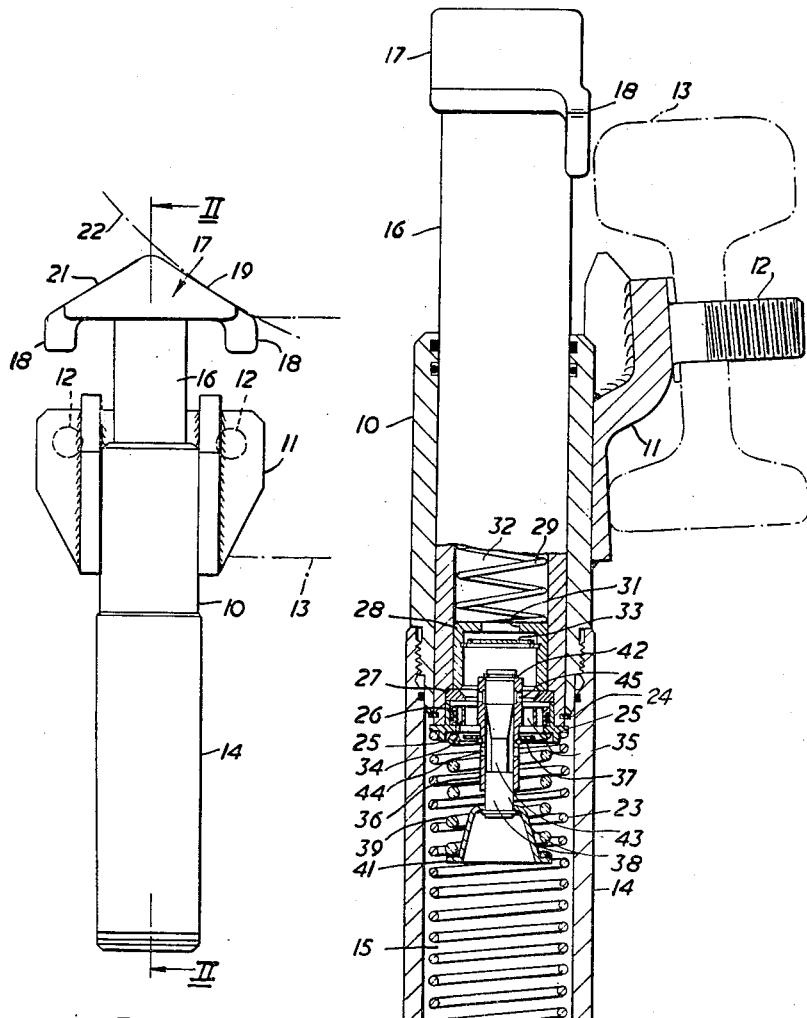

June 26, 1962 P. E. CHECKLEY ETAL 3,040,676
APPARATUS FOR CONTROLLING THE VELOCITY OF WHEELED VEHICLES
Filed May 9, 1960 3 Sheets-Sheet 1

INVENTORS
PETER E. CHECKLEY
BY DAVID E. BICK

Reynolds, Beach +
Christman
ATTORNEYS

June 26, 1962 P. E. CHECKLEY ETAL 3,040,676
APPARATUS FOR CONTROLLING THE VELOCITY OF WHEELED VEHICLES
Filed May 9, 1960 3 Sheets-Sheet 2

INVENTORS
PETER E. CHECKLEY
BY DAVID E. BICK
Reynolds, Beek &
Christensen
ATTORNEYS

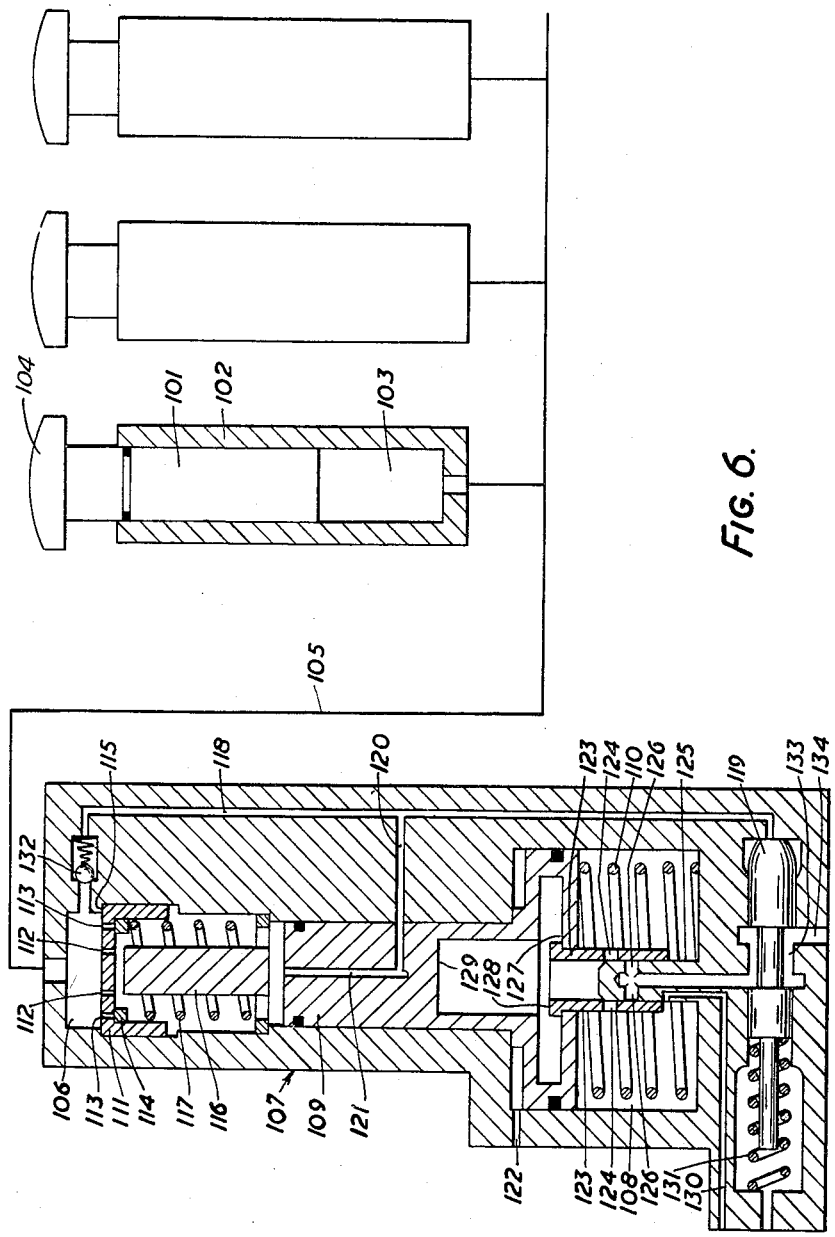

United States Patent Office 3,040,676
Patented June 26, 1962

3,040,676
APPARATUS FOR CONTROLLING THE VELOCITY OF WHEELED VEHICLES
Peter E. Checkley, Charlton Kings, Cheltenham, England, and David E. Bick, Cheltenham, England, assignors to Dowty Hydraulic Units Limited, Tewkesbury, England, a British company
Filed May 9, 1960, Ser. No. 27,603
Claims priority, application Great Britain May 11, 1959
12 Claims. (Cl. 104—162)

This invention relates to track-mounting apparatus for controlling the speed of free running railway vehicles. When shunting railway vehicles in marshalling yards and sidings, there is liable to be considerable variation of vehicle speed due to a variety of causes. At the higher speeds damage may be caused to vehicles which collide or to freight carried by them, while at the lower speeds vehicles may not have sufficient momentum to take them to the desired position.

Track mounted braking devices have been proposed such as friction bars which can be pressed against the wheel flanges, and hydraulic dashpot devices which act against the wheel rims or peripheries, or their axles, but such prior devices at best provide only a partial solution to the problem of speed control.

It is an object of the present invention to provide track mounting apparatus of simple and compact construction which will act automatically to reduce vehicle speed towards a predetermined critical value.

Another object is to provide apparatus which will act automatically to increase the speed of slow moving vehicles towards such a predetermined critical value.

Still further, it is an object to provide apparatus which will act automatically as above to reduce vehicle speeds above the critical value, and which can act automatically to boost vehicle speeds below that or some other critical value.

By such means the vehicles and their contents are protected against damage by excessive speeds, and are assured of a boost in speed if necessary to cause them to reach their objective.

According to the invention, track mounting speed control apparatus for railway vehicles comprises a liquid-filled piston and cylinder unit adapted to act against the periphery of a vehicle wheel, means operative to resist displacement of liquid from the cylinder by the piston so that the unit can exert a retarding force on the vehicle wheel, and a device responsive to vehicle speed acting to render said means inoperative, so as to impose no retardation, when the vehicle speed is less than a critical speed.

According to a further feature of the invention the piston and cylinder unit is arranged to be actuated by pressure fluid from an external source so as to exert an accelerating force on the vehicle wheel, the speed-responsive device acting at vehicle speeds above the critical speed to prevent such actuation of the unit by the pressure fluid, and so to prevent acceleration of the vehicle.

Figure 3:
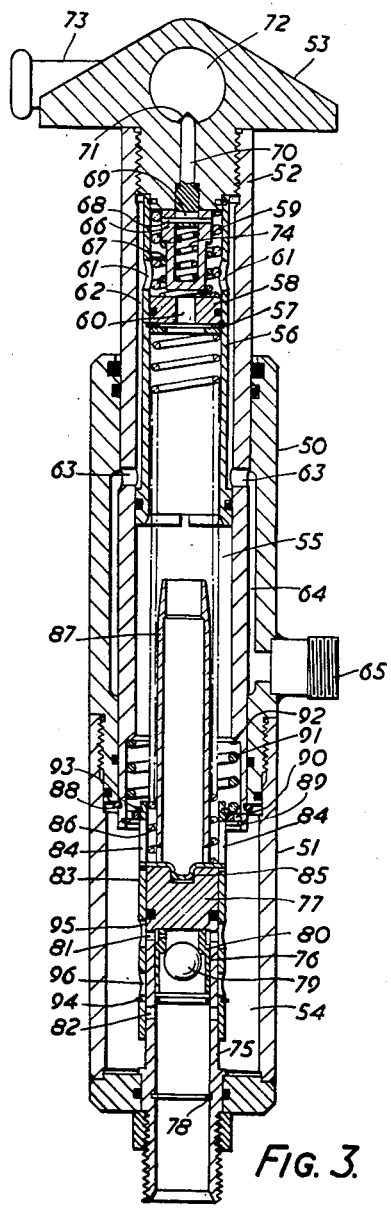
Figure 4:
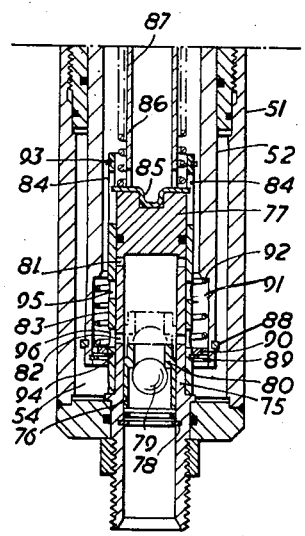
Figure 5:
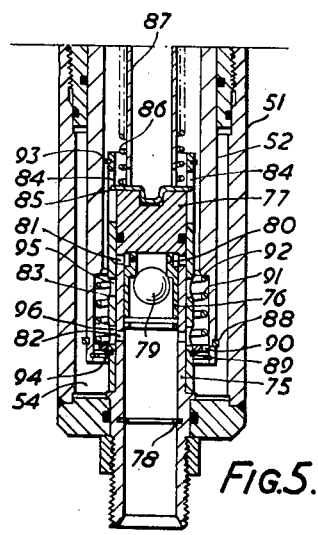

These and other features of the invention are embodied in speed controlling apparatus now to be described with reference to the accompanying drawings, of which:

FIGURE 1 shows the installation of a retarder unit;
FIGURE 2 is a longitudinal section on the line II—II of FIGURE 1;
FIGURE 3 is a longitudinal section of a retarder and accelerator unit shown fully extended;
FIGURES 4 and 5 show the lower part of the unit at different stages of operation; and
FIGURE 6 is a diagram of another form of retarder and accelerator apparatus.

The retarder of FIGURES 1 and 2 comprises a bearing tube 10 adapted by means of a bracket 11 and bolts 12 to be mounted in a vertical position on the inside of a railway track against a rail 13. A cylinder 14 is fixed to the bearing tube 10 and has an internal chamber 15 filled with oil into which a cylindrical piston 16 can enter. The piston 16 is slidably mounted in the bearing tube 10 and is closed from above by a head 17 having two ears 18 disposed close alongside the head of the rail 13 to prevent the head 17 from turning. The head 17 is of triangular form having two sloping sides 19 and 21 which are engaged successively in rolling contact by the flange 22 of the vehicle wheel, see FIGURE 1, as the vehicle travels from right to left. The head 17 projects above the rail 13 when freely extended, but is depressed by the wheel flange below the top of the rail when the wheel passes over the apex of the head.

The piston 16 is extended by a spring 23 to a position at which a circlip 24 recessed in the lower end of the piston 16 abuts against the lower end of the bearing tube 10 and limits its extension. A valve housing 25 fixed within the lower end of the piston 16 contains a clack valve 26 having end play between the housing 25 and a seating ring 27. A separator piston 28 is slidable within the piston tube 16 and in its lowest position abuts the seating ring 27 under pressure of a spring 29. The level of oil above the chamber 15 lies approximately at a central orifice 31 in the separator piston 28, while a chamber 32 within the piston 16 is filled above the liquid level with air at low pressure. An apertured valve disc 33 is captively retained within the separator piston 28 and its function is to close under any flow of liquid from the chamber 15 to the chamber 32, but in the static condition to remain open so that any air and oil mixture can freely separate out into the respective chambers.

The clack valve 26 has an outer row of holes 34 disposed radially outwardly beyond the inner edge of the seating ring 27, and an inner row of holes 35 disposed radially within said edge. The clack valve is, moreover, formed with a central valve cylinder 36 on which a plate valve 37 is captively retained, this plate valve 37 being movable upwardly to close the inner row of holes 35. A relief valve piston 38 is slidable within the valve cylinder 36 and spring-loaded downwardly by a coil spring 39 which is interposed between the valve housing 25 and a spring retainer 41 carried by the lower end of the relief valve piston. The upper end of the latter carries a stop 42 normally abutting the upper end of the valve cylinder 36. The middle portion of the valve piston 38 is formed by a stem 43 having clearance from the bore of the valve cylinder 36 so as to be capable, when raised against the load of spring 39, of providing communication across the clack valve 26 between lower ports 44 and upper ports 45 through the wall of valve cylinder 36.

It will be seen that the coil spring 39 acting through the retainer 41, relief valve piston 38, stop 42 and valve cylinder 36 presses the clack valve 26 downwardly on the internal flange of the housing 25 and away from the seating ring 27 to establish free communication between the chambers 15 and 32 through the holes 34 and 35, the valve disc 33 and the central orifice 31 in the separator piston. When a vehicle wheel engages the head 17 to depress the piston 16, the plate valve 37 is raised by the flow of liquid to close the inner holes 35 in the clack valve so that continued flow must take place through the outer holes 34. The clack valve 26 also tends to rise and to close these outer holes 34. The strength of the spring 39 and the total effective aperture provided by the holes 34 are mutually determined so that the clack valve 26 is responsive to vehicle speed, and will close the holes 34 also when the vehicle wheel engages the head 17 at, or above, a predetermined critical velocity.

If the vehicle is moving at less than the critical velocity the clack valve 26 and its orifices 34 will remain open and hydraulic liquid will enter the separator piston 28 to close the freely movable valve disc 33 against the central orifice 31, whereupon the separator piston 28 will continue to rise against the relatively light resistance of the spring 29 and the air in the chamber 32. The piston 16 will therefore offer no appreciable resistance to the passage of a vehicle wheel over the head 17 at less than the critical velocity.

If the vehicle is travelling at, or above, the critical velocity the clack valve 26 will rise against the seating ring to close the orifices 34 so that liquid from the chamber 15 is compelled to flow into the chamber 32 through the relief valve. Pressure on the lower end of the relief valve piston 38 raises the latter within the valve cylinder 36 against the load of the spring 39, as described, to establish communication from the lower ports 44 to the upper ports 45. The blow-off pressure of the relief valve is determined by the load of the spring and area of the piston 38 to give a specified resistance to downward movement of the piston 16. While other means of restricting the flow between the chambers 15 and 32 may be provided, a relief valve as described is preferred so that the resistance provided thereby does not vary substantially with different velocities of the vehicle above the critical value.

When the vehicle wheel passes beyond the apex between the surfaces 19 and 21 on the head so that the spring 23 causes the piston 16 to commence to rise, the pressure in the liquid-filled chamber 15 will fall thus permitting the clack valve 26 and plate valve 37 to undergo downward opening movement so that the oil may flow freely from the portion of the chamber 32 below the separator piston 28 into the chamber 15.

The angle which each sloping side 19 and 21 of the head 17 makes with the horizontal is chosen so that when the piston 16 is fully raised, vehicle wheels of different diameter will all make tangential contact with the side 19 or 21. By this means the initial downward velocity of the piston 16 is determined only by the vehicle speed, irrespective of wheel diameter, whereby the clack valve 26 will close at a constant critical vehicle speed.

The retarder and accelerator unit shown in FIGURE 3 comprises a bearing tube 50 adapted to be secured in a vertical position against a rail as in the preceding example. A cylinder 51 is fixed to the lower end of the bearing tube 50 and a piston 52 having a head 53 of like form to that in the preceding example is slidably mounted in the bearing tube 50.

A lower chamber 54 enclosed between the cylinder 51 and piston 52 is in open communication with an upper chamber 55 disposed within the piston. A clack valve housing 56 of cylindrical form is sealingly engaged at its lower end within the bore of the piston 52 while its upper end is fixed in the head 53. A circlip 57 fixed within the housing 56 forms an end stop for a disc-shaped clack valve 58 which is urged downwardly by a coil spring 59 seated against the head 53. A central opening 60 in the clack valve connects the upper chamber 55 with the upper part of the housing 56, while transverse holes 61 in the latter open into an annular gap 62 formed between the housing 56 and the piston 52. The lower end of the annular gap 62 opens through transverse holes 63 into an annular gap 64 formed between the piston 52 and an undercut recess in the bearing tube 50, this gap in turn leading to an external connector 65 on the bearing tube for a low pressure pipe. A thimble-shaped clack valve seat 66 adapted to close the central opening 60 in the clack valve 58 is spring-loaded upwardly towards the head 53 by a coil spring 67 which rests on the clack valve. The clack valve seat 66 has a pin 68 therein passing through a slot 69 in a plunger which is slidably mounted in the head 53 to provide a lost motion connection between the valve seat 66 and plunger 70. The upper end of the plunger engages a cam formed by a recess 71 in a pivot pin 72 which is mounted transversely in the head 53. A lever 73 whose outer end is adapted for engagement by the flange of a vehicle wheel is made fast with the pivot pin 72 so as to turn therewith. A spring 74 received in the clack valve seat 66 urges the plunger 70 upwardly into engagement with the cam 71.

A valve-controlled connector communicating with an external source of pressure liquid is provided by a hollow stem 75 which is fixed centrally in the lower end of the cylinder 51. A pressure-responsive cut-off valve member 76 of cylindrical form is slidably mounted in the bore of the stem 75 to move between an upper limit provided by a head 77 which closes the hollow stem, and a lower limit provided by a circlip 78 fixed in the stem. A ball non-return valve 79 engageable with a seat 80 is captively retained in the cut-off valve 76. The hollow stem 75 forms a fixed ported valve member having upper ports 81 and lower ports 82 formed therein. A movable ported valve member formed as a valve sleeve 83, is slidably mounted on the stem 75 and prevented from turning thereon by longitudinal slots 84 into which extend the ends of a keeper 85 retained in the head 77 of the stem 75. A coil spring 86 interposed between the keeper 85 and the circlip 57 in the clack valve housing 56 acts to extend or project the piston 52 from the bearing tube 50 and cylinder 51. A spring guide 87 fixed to the head 77 extends upwardly within the spring 86. A circlip 88 fixed in the lower end of the piston 52 co-operates with the bearing tube 50 to form an out-stop for the piston 52. A circlip 89, within the lower end of the piston 52, provides a seat for a peripherally slotted stop ring 90 while a coil spring 91 is interposed between an internal step 92 in the piston 52 and the stop ring 90. Axial movement of the stop ring 90 with respect to the valve sleeve 83 about which it slidably fits is limited by circlips 93 and 94 located in the upper and lower portions respectively of the valve sleeve 83. The valve sleeve 83 has axially spaced upper ports 95 and lower ports 96 which co-operate with the upper and lower ports 81 and 82 in the hollow stem 75 in a manner to be described.

*Operation*

When a vehicle wheel engages the head 53, travelling from right to left, the piston 52 starts to descend so that liquid in the lower chamber 54 and upper chamber 55 commences to flow through the central opening 60 in the clack valve 58. The liquid proceeds from there through the holes 61 in the housing 56, the annular gap 62, the holes 63 in the piston, the annular gap 64, and through the connector 65 into the low pressure pipe. If the vehicle is travelling above the critical velocity the pressure drop across the opening 60 will cause the clack valve 58 to close on to the valve seat 66. The out-flow into the low pressure line at the connector 65 then ceases and liquid can only pass through the ports 95 and 81 of the valve sleeve and hollow stem which lie in register when the valve sleeve 83 is in its uppermost position as in FIGURE 3. The pressure will rapidly build up in excess of that holding the cut-off valve 76 in its uppermost position, and it will move the cut-off valve 76 downwardly into engagement with the circlip 78. Continued flow displaces the ball valve 79 from its seat 80, whereby the resistance to depression of the piston is provided by pumping the liquid from the lower chamber 54 back into the hydraulic pressure line connected with the hollow stem 75. The source may be arranged to store this liquid pressure energy for subsequent use.

When the piston 52 nears the limit of inward travel the stop ring 90 under the resilient load of the spring 91 engages the lower circlip 94 to displace the valve sleeve 83 to its downward limiting position, as seen in FIGURE 4. The lower ports 96 and 82 in the valve sleeve 83 and hollow stem 75, which were previously out of register, are now in register, and permit the escape of hydraulic liquid from the bore of the stem 75 above the cut-off valve 76 when the piston 52 starts to rise in consequence of the vehicle wheel axle passing over the axis of the unit. The cut-off valve 76 can only rise to the position shown in chain-dot lines where its upper edge closes the lower ports 82, because the upper co-operating ports 95 and 81 lie out of register and no fluid can pass through these.

Low pressure liquid supplied to the connector 65 can, however, enter the unit as the internal volume expands because the pressure across the clack valve 58 falls and allows it to be moved off its seat 66 by the spring 59. The piston, therefore, will extend fully under the comparatively light force of the spring 86 and such low pressure as may prevail in the low pressure line at the connector 65.

As the piston 52 nears its uppermost position, the stop ring 90 will engage the circlip 93 at the upper end of the valve sleeve 83 and lift the latter so that the lower co-operating ports 96 and 82 are displaced while the upper co-operating ports 95 and 81 enter into register. Liquid can now escape from the upper end of the hollow stem whereby the cut-off valve 76 is raised to its uppermost position by pressure connected to the lower end of the stem 75.

If the vehicle is travelling at less than the critical velocity on approaching the unit, it will not cause sufficient pressure drop across the opening 60 to close the clack valve 58 on its seat 66.

The cut-off valve 76 remains in its uppermost position under the pressure in the hollow stem, while liquid from the lower chamber 54 is displaced through the upper chamber 55 and clack valve opening 60 to be discharged ultimately into the low pressure line at the connector 65. Downward movement of the piston 52 is therefore substantially unimpeded, but near the end of its downward stroke the spring-loaded stop ring 90 engages the lower circlip 94 to displace the sleeve 83 into the position shown at FIGURE 5. The lower ports 96 and 82 are now in register and since the cut-off valve 76 lies above the port 82 pressure liquid supplied to the hollow stem can enter the lower chamber 54 and force the piston 52 upwardly. Since the axle of the vehicle wheel will then have just passed over the central axis of the unit, the head 53 exerts a strong upward force on the flange of the vehicle wheel which imparts an acceleration to the latter. As the piston 52 reaches its uppermost position it again lifts the valve sleeve 83 in the manner described so that the unit is ready to undergo another cycle of operations.

The lever 73 operates to prevent the unit from acting as a vehicle accelerator when the vehicle is moving in the reverse direction, that is from left to right in FIGURE 3. In the latter case the wheel flange will first engage the lever 73 and turn the pivot pin 72 so that the cam 71 depresses the plunger 70, the plunger acting in turn to close the valve seat 66 on the opening 60 in the clack valve 58. The unit will, therefore, always operate as a retarder when a vehicle is travelling from left to right, but will operate either as a retarder or accelerator when the vehicle is moving from right to left, according to whether the vehicle is travelling above or below the critical speed.

The retarder and accelerator unit may be rendered inoperative by stopping pressure generation at the source and by freely connecting the source with the low pressure pipe line.

The retarder units or the retarder and accelerator units described in the foregoing examples are mounted in pairs, one on each side of the railway track. It is, moreover, desirable to mount a number of such pairs along the track to act in succession on the wheels of a vehicle because the force which can be exerted by any one pair of units must be limited so that they cannot lift the wheels off the track.

In a marshalling yard installation where the energy of fast moving vehicles which has to be absorbed is greater than the energy which has to be imparted to slow moving vehicles, both kinds of units may be provided as all units will be capable of retarding fast moving vehicles whereas a smaller number of them will be sufficient to provide the required acceleration of slow moving vehicles, yet will not act to accelerate the faster moving vehicles.

Referring to FIGURE 6 the apparatus comprises a piston 101 fitted into a cylinder 102 which is mounted on the rails in such a position that the piston head 104 of the piston is moved downwardly when a vehicle wheel passes over it.

The chamber 103 below the piston 101 is connected by a pipeline 105 to an upper liquid chamber 106 of an intensifier device 107. The upper chamber 106 is separated from a lower air chamber 108 by a double-ended piston 109 which is slidably mounted in the respective chambers 106 and 108 and which is urged upwardly by a spring 110. The lower end of the piston 109 has a larger cross-sectional area than the upper end of the piston.

Housed within the chamber 106 and slidably mounted therein is a clack valve 111 having inner orifices 112, and outer orifices 113 which are normally closed by a main pressure relief valve member 114 slidably mounted within the clack valve 111. The clack valve is mounted for restricted movement between an up-stop 115 and a central rigidly fixed down-stop 116 (shown as a vertically extending post), but is normally held against the up-stop by a spring 117 acting against the pressure relief valve member 114.

A second pressure relief valve 132 opens from the upper part of the chamber 106 to a passage 118 which extends to the end of the bore 133 of a spool valve against which end the spool 119 is held by the spring 131. A further passage 120 opening into the passage 118 communicates, when the piston 109 is uppermost as shown, with a passage 121 in the smaller end of the piston 109 which opens into the lower part of chamber 106. The chamber 103, pipeline 105, chamber 106 and passages 118, 120 and 121 are filled with hydraulic liquid.

In the upper part of the chamber 108, above the larger end of the piston 109, a passage 122 communicates between the upper part of chamber 108 and the atmosphere.

A sleeve valve 123 having ports 124 therein, is mounted as a close but sliding fit on a spigot 125. The spigot 125 has ports 126 therein normally communicating with a high pressure air supply connection 134 which opens into the valve bore 133, the ports 126 being normally closed from the chamber 108 by the sleeve valve 123. The sleeve valve 123 is held in this closed position by a transverse face 127 of the piston 109 which engages beneath a flange 128 on the sleeve valve. A passage 130 in the spigot 125 connects the chamber 108 with the atmosphere when the sleeve valve 123 is fully raised. The larger end of the piston 109 is hollowed out to receive the sleeve valve 123 with an opening in its lower face providing a loose fit on the sleeve valve. An abutment face 129 inside the hollowed out part of the piston 109 is provided.

When a vehicle is moving faster than a critical speed, the vehicle wheel acting on the piston 101 displaces liquid at a high rate from the chamber 103 into the chamber 106 and through the orifices 112. The resulting pressure difference across the orifices 112 will therefore move the clack valve 111 downwardly to seat on the down-stop 116, thereby closing the orifices 112.

At a predetermined pressure in the chamber 106 the second relief valve 132 opens first and discharges liquid into the passage 118 whereby the valve spool 119 is displaced against the load of the spring 131 to close the air supply connection 134. Liquid under pressure within the upper part of the chamber 106 then flows through the orifices 113 which are normally closed by the main relief valve member 114. The pressure required to open the main relief valve is very considerably higher than the pressure needed to close the clack valve, and as a result downward movement of the piston 101 will necessarily dissipate a considerable amount of energy.

Hydraulic liquid flowing through the orifices 113 will cause the piston 109 to move downwards, expelling the air from the chamber 108 through the passage 130. Ultimately the abutment 129 engages the flange 128 thereby moving the sleeve valve 123 downwards over the passage 130 to isolate the chamber 108 from the atmosphere, and bring the ports 124 and 126 into register. The valve spool 119 maintains the compressed air connection 134 closed so that no high pressure air will be admitted into the chamber 108 when the piston 109 rises after the vehicle wheel passes over it.

When the piston 109 reaches the end of its upward travel the passage 121 will align itself with the passage 120 so allowing the escape of liquid from the passage 118 into the chamber 106 above the piston 109. The spool valve 119 will therefore return under spring pressure to connect the pressure connection 134 with the spigot ports 126, but as the sleeve valve 123 will have been moved upwardly by the piston 109 to close the ports 126 no high pressure air will be admitted into the chamber 108. Thus no accelerating force will be imparted to the passing vehicle wheel.

When a vehicle is moving slower than the critical speed and the wheel depresses the piston 101, liquid is displaced from the chamber 103 to the chamber 106 and through the clack valve orifices 112, but the pressure across the orifices 112 is insufficient to close the clack valve 111 against the load of the spring 117. The liquid flowing through the orifices 112 moves the piston 109 downwardly against the light spring 110. The relief valve 132 remains closed so that the valve spool 119 maintains the connection of compressed air to the spigot ports 126 though these ports 126 are closed by the sleeve valve 123.

As the piston 101 nears the end of its downward travel, the abutment surface 129 thereon will engage and displace the sleeve valve 123 to close the passage 130 and open the spigot ports 126 through the sleeve ports 124 to the chamber 108, permitting high pressure air to enter this chamber. This will urge the piston 109 upwardly and in so doing will displace the liquid from the chamber 106 through pipeline 105 to the chamber 103 underneath the piston 101. An accelerating force is thereby imparted to the vehicle wheel as its axle passes away from the vertical axis of the piston 101.

If so desired there may, as shown, be more than one valve-controlled piston unit 101, 102 arranged along the track so as to be engaged in succession by a vehicle wheel, each unit 101, 102 being controlled in turn by a single intensifier device 107.

We claim as our invention:

1. Speed control apparatus suitable for free-running railway vehicles comprising a unit having relatively-movable piston and cylinder members together enclosing a volume of liquid, one of the members being adapted for fixed mounting adjacent a track rail and the other member being adapted for engagement by the periphery of a vehicle wheel moving along the track rail to effect relative inward closing and then outward opening movement of said members, means affording flow of liquid from the volume of liquid upon closing movement of said members, with no appreciable resistance, means affording flow of liquid from the volume of liquid upon such closing movement with appreciable resistance, and valve means operatively associated with the two flow-affording means and so arranged that when either flow-affording means is operative the other is inoperative, and further arranged to render the means affording flow of liquid with no appreciable resistance inoperative at rates of closing above a critical amount.

2. Apparatus according to claim 1 wherein the means affording flow of liquid with no appreciable resistance includes a low pressure outlet for the volume of liquid in one of said members, and further comprising a device responsive to vehicle speed, and including a valve seat interposed between the cylinder and the low pressure outlet, a clack valve disposed adjacent the valve seat on the side thereof which is in communication with the cylinder, and a spring acting on the clack valve to urge it away from the valve seat but being yieldable under liquid flow from the cylinder above a predetermined rate caused by a vehicle wheel acting on said unit and moving above the critical speed to which said predetermined rate of flow corresponds.

3. Apparatus according to claim 2, wherein said means to resist liquid displacement comprises a spring-loaded pressure-relief valve interposed between the cylinder and the low pressure outlet to discharge across the clack valve.

4. Apparatus according to claim 3, wherein the relief valve comprises a pressure relief passage extending through the clack valve, and an element mounted movably in said clack valve to open and close said passage, said spring acting upon the movable element to close the passage and acting through said element upon the clack valve.

5. Apparatus according to claim 2, wherein the low pressure outlet comprises an air-filled chamber which is formed within the piston, into which chamber the liquid is displaced when the piston and cylinder unit is contracted and from which liquid returns to the cylinder when the unit extends.

6. Speed control apparatus for free running railway vehicles comprising a unit having piston and cylinder members together enclosing a volume of liquid, of which one member is adapted for fixed mounting adjacent a track rail and the other member is adapted to act against the periphery of a vehicle wheel, a low pressure outlet connected to the cylinder, means operative to resist displacement of liquid from the cylinder to the low pressure outlet, a valve-controlled inlet to the cylinder, a pressure source connected to said inlet, and a device responsive to vehicle speed acting to render said means inoperative when the speed of an approaching vehicle wheel is less than a critical value, and acting as the vehicle wheel passes to open the valve-controlled inlet whereby liquid from the pressure source is admitted to the piston and cylinder unit so as to apply an accelerating force on the vehicle wheel.

7. Speed control apparatus for free running railway vehicles comprising a unit having piston and cylinder members together enclosing a volume of liquid, of which one member is adapted for fixed mounting adjacent a track rail, a head mounted for conjoint movement with the other member in a position to engage the periphery of a vehicle wheel so as to effect relative movement of said members in opposite directions as the vehicle wheel approaches and passes away from the head, a low pressure liquid outlet connected to the cylinder, a first valve interposed between the cylinder and the low pressure liquid outlet, said first valve being responsive to the rate of flow of liquid from the cylinder so as to close when the rate of flow exceeds a predetermined value, a high pressure liquid source connected to the cylinder, and a second valve interposed between the cylinder and the high pressure liquid source, said second valve including a non-return valve arranged to open under a liquid pressure within the cylinder which exceeds the high pressure of the liquid source, whereby upon closure of the first valve by a rate of liquid flow above the predetermined value caused by a vehicle wheel displacing said head and moving above a critical speed corresponding to the predetermined rate of liquid flow, said head is operative to apply a retarding force to the vehicle wheel by displacement of liquid from the cylinder through the non-return valve against the back pressure of the liquid source.

8. Speed control apparatus for free running railway vehicles comprising a cylinder adapted for fixed mounting against a track rail, a piston mounted in the cylinder to enclose therewith a volume of liquid, a head mounted on the piston in a position against the rail to engage the periphery of a vehicle wheel so as to effect inward and outward strokes of the piston in the cylinder as the vehicle wheel approaches and passes away from the head, a low pressure liquid outlet connected to the cylinder, a first valve interposed between the cylinder and the low pressure liquid outlet, said first valve being responsive to the rate of flow of liquid from the cylinder upon the inward stroke of the piston so as to close when the rate of flow exceeds a predetermined value, a high pressure liquid source connected to the cylinder, and a second valve interposed between the cylinder and the high pressure liquid source, said second valve including a non-return valve arranged to open under a liquid pressure within the cylinder which exceeds the high pressure of the liquid source, a valve member fixed to the cylinder having axially separated upper and lower ports, a movable valve member having axially separated upper and lower ports, a lost motion connection between the piston and the movable valve member operative to shift the movable valve member into two end positions upon completion of the inward and outward strokes of the piston in the cylinder respectively to bring the lower ports of the fixed and movable valve members into register in one end position and the upper ports of the fixed and movable valve members into register in the other end position, and a pressure-responsive valve member movable in co-operation with the fixed valve member between an upper limit stop against which it lies disposed above the lower ports in the fixed valve member, and a lower limit stop against which it lies disposed below the lower ports in the fixed valve member, the pressure-responsive valve member being exposed at its lower end to the high pressure liquid source and at its upper end, when the upper ports of the fixed and movable valve members are in register, to the pressure prevailing in the cylinder.

9. Apparatus according to claim 8, wherein the non-return valve is incorporated in the pressure-responsive valve member.

10. Apparatus according to claim 8, including a wheel-engaging element mounted in the head to one side thereof in the longitudinal direction of the rail so as to be engaged after the head when the wheel is travelling in one direction but before the head when the wheel is travelling in the opposite direction, and operating mechanism interposed between the wheel-engaging element and the first valve, said mechanism being operative to close the first valve when said element is engaged by the wheel.

11. Speed control apparatus for free running railway vehicles comprising a unit having a cylinder adapted for fixed mounting against a track rail, a piston mounted in the cylinder to enclose therewith a volume of liquid, and a head mounted on the piston in a position against the rail to engage the periphery of a vehicle wheel so as to effect inward and outward strokes of the piston in the cylinder as the vehicle wheel approaches and passes away from the head, and a control unit connected with the piston and cylinder unit comprising a body having concentric small and large bores, a piston having ends of corresponding small and large diameter mounted in said bores, a flow-responsive valve and a pressure-relief valve interposed is parallel between the connection with the piston and cylinder unit and the small bore, the pressure responsive valve being responsive to the rate of flow of liquid from the cylinder so as to close when the rate of flow exceeds a predetermined value, an inlet passage to said large bore adapted for connection with a source of pressure fluid operative to displace the piston of the control unit so as to force liquid into the piston and cylinder unit for applying an upward accelerating thrust on the vehicle wheel, and a pressure-responsive valve interposed in said inlet passage, said pressure-responsive valve being connected with the piston and cylinder unit and operative under liquid pressure developed therein, upon closure of said flow responsive valve, to close said inlet passage.

12. A combined retarder and accelerator mechanism for railway vehicles which run free along a track, to retard such a vehicle running at speeds above a critical speed, or to accelerate such a vehicle running at a speed below a critical speed, said mechanism comprising a piston and cylinder unit enclosing a volume of liquid, means located for depression by the wheel flange of a passing vehicle, means urging said depressible means to its initial raised position, said depressible means being operatively connected to said piston and cylinder unit to constrict the same when depressed, and so to effect outflow of liquid from the volume within the piston and cylinder unit, means sensitive to speed of outflow and operable to interpose appreciable resistance to such outflow at speeds above a critical value, and thus to retard the wheel the flange whereof is depressing the depressible means, said means sensitive to speed of outflow being further operable to interpose no appreciable resistance to outflow at speeds below such critical value, and thus to impose no retardation on the wheel the flange whereof is depressing the depressible means, and valve-controlled means to apply a positive force to said piston and cylinder unit to expand the same and to urge said depressible means upwardly, when the speed-sensitive means is operable to interpose no appreciable resistance, and thus to accelerate the wheel the flange whereof is in engagement with the rising depressible means.

References Cited in the file of this patent

UNITED STATES PATENTS

| | | |
|---|---|---|
| 2,630,884 | Bone | Mar. 10, 1953 |
| 2,633,210 | Beltman et al. | Mar. 31, 1953 |